US010552267B2

(12) United States Patent
Bishop et al.

(10) Patent No.: US 10,552,267 B2
(45) Date of Patent: Feb. 4, 2020

(54) MICROCHECKPOINTING WITH SERVICE PROCESSOR

(71) Applicant: INTERNATIONAL BUSINESS MACHINES CORPORATION, Armonk, NY (US)

(72) Inventors: Bradley W. Bishop, Rochester, MN (US); Lee N. Helgeson, Rochester, MN (US); Michael R. Hines, White Plains, NY (US); James A. O'Connor, Ulster Park, NY (US)

(73) Assignee: International Business Machines Corporation, Armonk, NY (US)

(*) Notice: Subject to any disclaimer, the term of this patent is extended or adjusted under 35 U.S.C. 154(b) by 426 days.

(21) Appl. No.: 15/266,700

(22) Filed: Sep. 15, 2016

(65) Prior Publication Data
US 2018/0074909 A1 Mar. 15, 2018

(51) Int. Cl.
G06F 11/00 (2006.01)
G06F 11/14 (2006.01)
G06F 11/20 (2006.01)

(52) U.S. Cl.
CPC ...... G06F 11/1451 (2013.01); G06F 11/1466 (2013.01); G06F 11/2028 (2013.01);
(Continued)

(58) Field of Classification Search
CPC ............. G06F 11/1456; G06F 11/2056; G06F 11/1092; G06F 11/2028; G06F 11/2038;
(Continued)

(56) References Cited

U.S. PATENT DOCUMENTS 6,931,568 B2    8/2005  Abbondanzio et al.
6,944,785 B2 *  9/2005  Gadir .................. G06F 11/2005
                                              714/4.11
(Continued)

OTHER PUBLICATIONS

Whisnant "Micro-Checkpointing: Checkpointing for Multithreaded Applications", 2000, IEEE, p. 1-6, (Year: 2000).*
(Continued)

Primary Examiner — Bryce P Bonzo
Assistant Examiner — Jeison C Arcos
(74) Attorney, Agent, or Firm — Heslin Rothenberg Farley & Mesiti P.C.; Edward Wixted, Esq.

(57) ABSTRACT

A method, computer program product, and computer system to maintain high availability of a service processor. An embodiment provides program code with a location of a second service processor (the second service processor is communicatively coupled to the first service processor). The program code stops a virtual machine during runtime, including instruction execution and IO operations, where during runtime, the virtual machine executes one or more processes to service and manage computing resources in the distributed computing environment. The program code generates a micro-checkpoint of the virtual machine. The program code resumes the instruction execution of the virtual machine and transmits the micro-checkpoint to a second service processor based on the location and then resumes IO operations. The second service processor utilizes the micro-checkpoint to enable a hypervisor on the second service processor to start a virtual machine on the second service processor.

20 Claims, 9 Drawing Sheets

(52) U.S. Cl.
CPC .... *G06F 11/2038* (2013.01); *G06F 2201/805* (2013.01); *G06F 2201/815* (2013.01); *G06F 2201/84* (2013.01)

(58) Field of Classification Search
CPC ...... G06F 2201/84; G06F 3/065; G06F 3/067; H04L 41/06; H04L 41/08
See application file for complete search history.

(56) References Cited

U.S. PATENT DOCUMENTS

| | | | | |
|---|---|---|---|---|
| 7,143,307 | B1* | 11/2006 | Witte | G06F 11/1435 714/6.23 |
| 7,203,944 | B1* | 4/2007 | van Rietschote | G06F 9/45533 718/1 |
| 7,529,897 | B1* | 5/2009 | Waldspurger | G06F 11/1438 711/162 |
| 7,613,749 | B2* | 11/2009 | Flynn, Jr. | G06F 11/1662 |
| 8,032,780 | B2 | 10/2011 | Koh et al. | |
| 8,046,550 | B2* | 10/2011 | Feathergill | G06F 11/1466 711/162 |
| 8,407,518 | B2* | 3/2013 | Nelson | G06F 11/203 714/13 |
| 8,527,990 | B1* | 9/2013 | Marathe | G06F 9/45558 718/1 |
| 9,274,903 | B1* | 3/2016 | Garlapati | G06F 11/2002 |
| 9,684,567 | B2 | 6/2017 | Derk et al. | |
| 2003/0079156 | A1* | 4/2003 | Sicola | G06F 11/0727 714/4.1 |
| 2003/0221074 | A1* | 11/2003 | Satoyama | G06F 3/0605 711/162 |
| 2005/0198303 | A1* | 9/2005 | Knauerhase | G06F 9/5055 709/227 |
| 2006/0041789 | A1* | 2/2006 | Cochran | G06F 11/1469 714/37 |
| 2008/0126854 | A1 | 5/2008 | Anderson et al. | |
| 2009/0037554 | A1* | 2/2009 | Herington | G06F 9/4856 709/213 |
| 2010/0299666 | A1* | 11/2010 | Agbaria | G06F 9/4856 718/1 |
| 2011/0010560 | A1* | 1/2011 | Etchegoyen | G06F 11/2025 713/189 |
| 2011/0022879 | A1* | 1/2011 | Chavda | G06F 11/0793 714/1 |
| 2011/0202734 | A1 | 8/2011 | Dhakras et al. | |
| 2011/0208908 | A1* | 8/2011 | Chou | G06F 11/1662 711/112 |
| 2012/0030513 | A1* | 2/2012 | Peng | G06F 11/2097 714/37 |
| 2012/0084520 | A1* | 4/2012 | Chou | G06F 11/1484 711/162 |
| 2012/0084782 | A1* | 4/2012 | Chou | G06F 11/1484 718/102 |
| 2012/0151061 | A1* | 6/2012 | Bartfai-Walcott | G06F 9/4856 709/226 |
| 2013/0007506 | A1* | 1/2013 | Jain | G06F 11/1484 714/4.12 |
| 2013/0042150 | A1* | 2/2013 | McNeeney | G06F 11/366 714/38.1 |
| 2013/0042153 | A1* | 2/2013 | McNeeney | G06F 11/366 714/38.1 |
| 2013/0074065 | A1* | 3/2013 | McNeeney | G06F 11/141 718/1 |
| 2013/0185716 | A1* | 7/2013 | Yin | G06F 9/45558 718/1 |
| 2014/0007089 | A1* | 1/2014 | Bosch | G06F 9/4856 718/1 |
| 2014/0244949 | A1* | 8/2014 | Abali | G06F 3/065 711/162 |
| 2014/0310810 | A1* | 10/2014 | Brueckner | H04L 63/1441 726/23 |
| 2015/0127833 | A1* | 5/2015 | Hegdal | G06F 9/5016 709/226 |
| 2015/0278046 | A1 | 10/2015 | Zellemayer et al. | |
| 2015/0324255 | A1 | 11/2015 | Kochunni et al. | |
| 2015/0331704 | A1* | 11/2015 | Abali | G06F 9/45558 718/1 |
| 2015/0363282 | A1* | 12/2015 | Rangasamy | G06F 11/2033 714/4.12 |
| 2016/0188413 | A1* | 6/2016 | Abali | G06F 11/1438 714/15 |
| 2016/0378523 | A1* | 12/2016 | Abali | G06F 9/467 718/1 |
| 2018/0060104 | A1* | 3/2018 | Tarasuk-Levin | G06F 9/45558 |

OTHER PUBLICATIONS

Seggelmann, "Transport Layer Security (TLS) and Datagram Transport Layer Security (DTLS) Heartbeat Extension", Feb. 2012, IETF, p. 1-9 (Year: 2012).*
Clark, "Live Migration of Virtual Machines" 2005, USENIX University of Cambridge Computer Laboratory, p. 1-14 (Year: 2005).*
Microsoft "Computer Dictionary 5th Edition", 2002, Microsoft, p. 245 (Year: 2002).*
Liu, Haikin et al., "Live Migration of Virtual Machine Based on Full System Trace and Replay," HPDCC '09, pp. 101-110, ACM, 2009.
Zhang et al., "VirtCFT: A Transparent VM-Level Fault-Tolerant System for Virtual Clusters," ICPADS, pp. 147-154, IEEE, 2010.
Peter Mell et al., "The NIST Definition of Cloud Computing", National Institute of Standards and Technology, U.S. Department of Commerce, NIST Special Publication 800-145, Sep. 2011, 7 pages.

* cited by examiner

MICROCHECKPOINTING WITH SERVICE PROCESSOR

BACKGROUND

Checkpoints can be used to preserve the state of a server in detail, enabling users, service personnel, or other servers to capture a snapshot of what the server was doing at that instant of time. In the event of server failure, the preserved state can be used to resume server operations from the point in time of the last checkpoint on an alternate or backup server. As the server continues to run, new checkpoints are captured to help minimize the loss of processed data. If these new snapshots can be captured sufficiently fast, applications running on the server may continue to run unimpaired without any loss of data, of calculated results, or of transactions, in spite of the transition or failover to a backup server. Service processors are servers in their own right, but with the specialized purpose of supporting other servers. Service processors often need to rapidly respond to conditions that surface in the servers they are supporting. This rapid response time requirement has made it difficult to design service processors, where in the event of failure of the primary, the backup can transparently take over. Checkpoint designs for server processors often require sophisticated techniques to preserver the state of individual processes, state changes, and data changes, which can be highly complex and error prone to craft and maintain.

SUMMARY

Shortcomings of the prior art are overcome and additional advantages are provided through the provision of a method for providing high availability on a service processor in a distributed computing environment. The method includes, for instance: obtaining, by a processing circuit in a first service processor in a distributed computing environment, a location of a second service processor, where the second service processor is communicatively coupled to the first service processor; stopping, by the processing circuit, a virtual machine during runtime, where the virtual machine is executed by a hypervisor running on the first service processor, and where during runtime, the virtual machine executes one or more processes to service and manage computing resources in the distributed computing environment, where the stopping comprises stopping instruction execution and stopping IO operations; generating, by the processing circuit, a micro-checkpoint of the virtual machine by invoking a code path of the one or more processes to identify and copy dirty memory into a local staging area on the first service processor; resuming, by processing circuit, instruction execution by the virtual machine; and transmitting, by processing circuit, the micro-checkpoint to a second service processor based on the location, where a processing circuit of the second service processor utilizes the micro-checkpoint to enable a hypervisor on the second service processor to start a virtual machine on the second service processor; and resuming, by processing circuit, IO operations.

Methods, computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
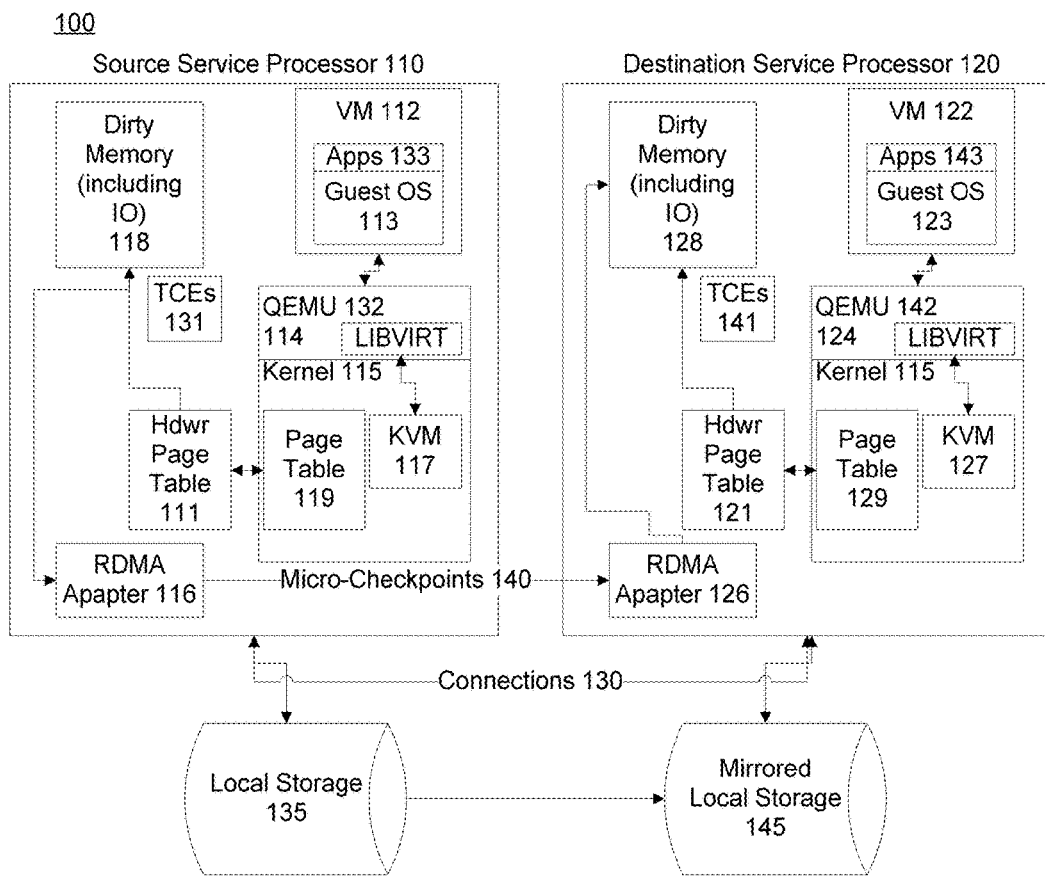
FIG. 1 is an example of a technical environments that includes certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
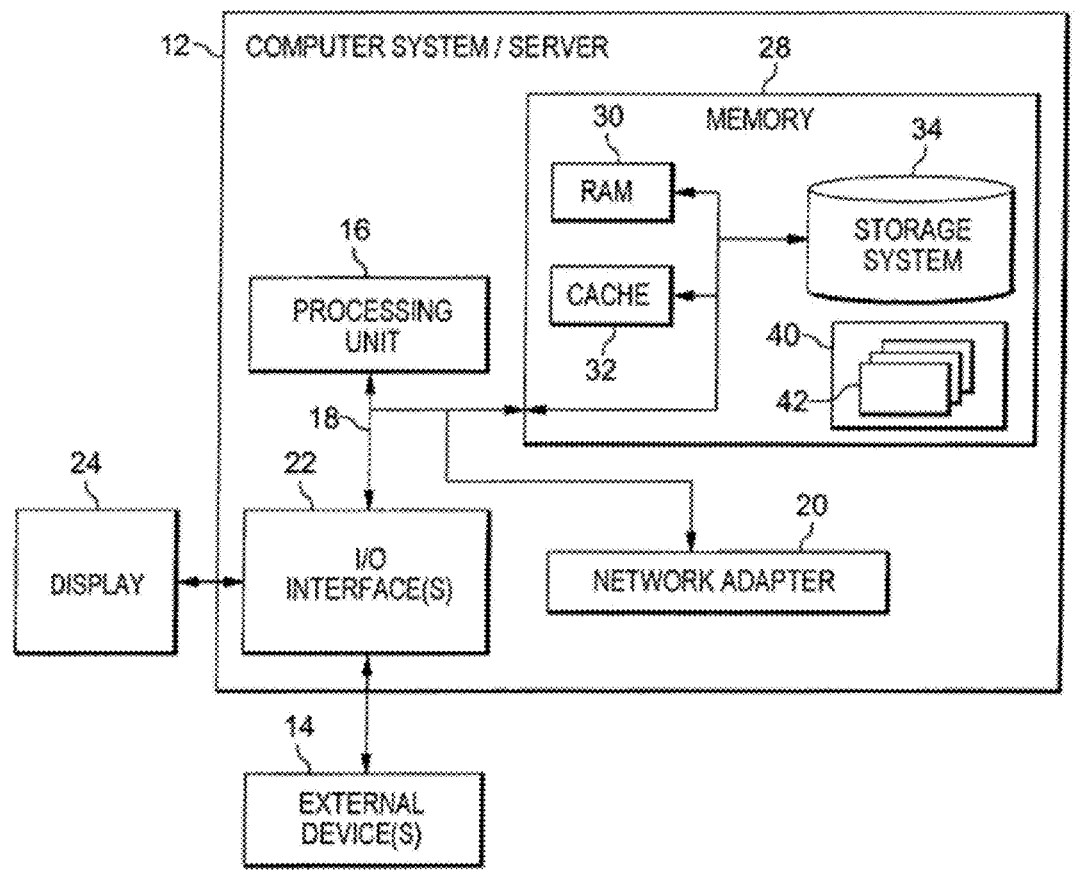
FIG. 7 depicts one embodiment of a cloud computing node.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

In traditional computing environments, a service processor does not handle continuous redundancy for either initialization of the system or of independent services provided by the service processor, including but not limited to, Advanced System Management (ASM or ASMi) and Initial Program Load (IPL). This is because checkpoint designs for server processors need to operate at a very high speed which often requires sophisticated techniques to preserve the state of individual processes, state changes, and data changes, which can be highly complex and error prone to craft and maintain. Thus, embodiments of the present invention provide fault tolerance for a service processor such that the service processor maintains continuous high availability redundancy for any of the functions of the service processor, including but not limited to, using the information from connections with remotes servers and service processor configurations to connect to, and manage, Internet Small Computer Systems Interface (iSCSI) attached integrated servers, identifying initiator systems utilizing information stored in the remote system configuration and the service processor configuration objects, and/or managing and/or communicating with a local area network (LAN) adapter, configuring connections utilizing network server configuration objects. Embodiments of the present invention enable this improvement that is inextricably tied to computer technology by moving functionality that is generally performed directly by a service processor, examples of which were previously enumerated, in an embodiment of the present invention, to a virtual machine (VM), and checkpointing the service processor during runtime. As understood by one of skill in the art, checkpointing consists of saving snapshots of execution states, so that one or more programs can restart from that point, in case of failure. Micro-checkpointing is checkpointing at a frequency high enough to prevent loss of application level data or transactions in the event of failover for both single and multi-threaded application environments.

In a further embodiment of the present invention, program code performs the described checkpointing without utilizing a virtualized environment. Embodiments of the present invention detect and checkpoint the memory in the service processor that has changed since the last checkpoint (i.e., the dirty memory). "Dirty memory" is file-backed memory in which the contents have been modified but not yet written back to disk. The in-memory version of data is out of sync with the on-disk version and is said to be dirty. A mechanism called writeback eventually updates the on-disk version, bringing the two in sync.

Memory changes included in the described checkpointing may include memory changes from the last checkpoint for all the VMs running on a given service processor, as well as the hypervisor memory changes itself. In an embodiment of the present invention, program code performing the aspects described, rather than being part of a virtual environment, is embodied in an Operating System running on hardware of the computing environment. The Operating System may be a known Operating System, including but not limited to, Linux, and/or customized or legacy code/firmware. As understood by one of skill in the art, in an embodiment of the present invention, the program code utilizes existing code paths to access the dirty memory to create checkpoints that can be utilized to restore the state of a service processor for purposes of providing high availability (HA), i.e., continuous operation for a desirably long length of time, to users.

Embodiments of the present invention differ from past attempts at providing fault tolerance for service processors (as well as standalone servers) in computing systems. Embodiments of the present invention utilize micro-checkpointing in service processors. Earlier solutions that involve checkpointing, but not service processors, have provided redundancy only by utilizing more than one server to execute the same commands, which creates inefficiencies and potential for errors with the computing system. For example, existing systems are designed with hardware lockstep, often with double or triple redundancy processors, with voting result resolution when one of the processors produces different results. Certain other existing systems differ and are limited insofar as where they would be implemented. For example, one existing approach is limited to running on a single core to provide a continuous availability high availability implementation, but the existing approach utilizes a record then replay type of checkpointing, where the application environment is copied to another server and run slightly delayed from the primary server application. The checkpoints are done by capturing IO operations from the primary server and then rerun on the backup server. The results are checked to make sure they are the same.

Existing systems address memory state micro-checkpointing standalone Linux servers, to provide a continuous availability high availability structure for applications running on x86 servers. However, these systems are not adaptable to provide high availability for service processors, (i.e., servers that control other servers and/or controlling hypervisor environments running client application environments). Standalone Linux servers running client applications differ from service processors, which are used to initialize, manage, monitor and control standalone servers running client application environments. Service processors monitor the physical state of the standalone server by connecting to sensors within the standalone server. The service processor can detect and diagnose abnormal conditions and then attempt to log information about the failure for use by a system administrator or field support engineer in problem determination and resolution. The service processor may also attempt to automatically recover from the failure. Service processors are also used to interface with and control hypervisors running on the standalone servers.

Unlike embodiments of the present invention, existing methods of providing (limited) high availability and redundancy for service processors do not support the hotswap (i.e., replacement while the computer system remains in operation) of service processors. Currently, high availability for service processors is severely limited and resource intensive to maintain because every critical high availability function/structure has to be individually designed and hand coded. These custom, hand coded processes are highly customized because of all the systems that a service processor is responsible for managing and monitoring. In order to create a process that accurately captures the operation of a service processor, a developer would require, for example, a detailed and through understanding of how each sub-function works and its interaction, role and dependency on other sub-function. Thus new and complex interaction problems can surface when code is changed or new functions are added to service processor. Embodiments of the present invention eliminate the resource intensive work necessary in this current design to maintain critical high availability function/structure because many of these functions no longer depend on individually designing and hand coding. Instead, as described in detail herein, the memory state changes are captured in a checkpoint. The micro-checkpointing utilized in embodiments of the present invention ensures that after failover, a backup service processor will be able to continue to operate without issue, including in link error scenarios and corner cases, which are arguably the most complex and problematic in the current design. The micro-checkpointing of the service processor, in embodiments of the present invention, enables support of service processor hot swap repair, which is not currently supported, due to the complexity.

In order to provide high availability, in an embodiment of the present invention, the program code executed by a processing circuit in a first service processor in a distributed computing environment obtains a location of a second service processor, where the second service processor is communicatively coupled to the first service processor. This program code then stops one or more programs executing on the processing circuit. These one or more programs are executed on the first service processor and during runtime, the one or more programs execute one or more processes to service and manage computing resources in the distributed computing environment. The program code generates a micro-checkpoint by invoking a code path of the one or more programs to identify and copy dirty memory into a local staging area on the first service processor. The program code then resumes the one or more programs. The program code transmits the micro-checkpoint to a second service processor, based on the location, where a processing circuit of the second service processor utilizes the micro-checkpoint to enable the second service processor to start the one or more processes on the second service processor.

An advantage provided by certain embodiments of the present invention is that by moving functionality to a VM or other program executing on one or more processors of a service processor, during checkpointing, the service processor will not run into timing conflicts, which cause redundancy to fail. Another advantage of certain embodiments of the present invention is a decrease in issues caused by bugs in program code executed by the service processor, because aspects of the implementation of the described functionality in the VM, or other program executing on one or more processors of a service processor decreases, interface interactions with dependent components. Another advantage provided by embodiments of the present invention is that aspects of the described implementation of functionality in a VM or another program, decrease the complexity of the original synching design utilized when the functionality remains in the service processor because both the VM and/or other program can utilize existing code paths and the dirty memory. Thus, due to the fact that synching no longer needs to occur on a per-process basis within the service processor, but instead on a whole-VM and/or whole program (including all programs included in the checkpoint) basis, processes are simplified and leave room for fewer unintended errors.

As will be discussed herein, embodiments of the present invention provide and apply a memory state micro-checkpoint structure to service processors to achieve high availability. Service processors have unique requirements within computing environments. For example, service processors service and manage servers, including application servers, in a distributed computing environment, which includes servers that handle the hypervisor (virtual machine monitor) functions of the hypervisors that reside on the servers. For example, such as environments serviced and managed by a service processor, e.g., a flexible service processor (FSP), may include POWER Servers that handle critical Power Hypervisor (PHYP) functions residing on the servers. The aforementioned POWER Servers may utilize an error recovery PSI (Processor Support Interface) link, which is a unique interface between the service processor and PHYP running on the POWER application server. The FSP in this environment may also include a NAND (negative-AND) flash structure that holds nonvolatile data to capture and handle state changes as part of the micro-checkpoint system of an embodiment of the present invention. Unlike in the aforementioned existing systems to service processor redundancy, embodiments of the present invention do not include a need to design, individually and/or hand code, each critical HA function/structure because memory state changes are captured in the checkpoints, which handle this functionality.

Certain environments into which aspects of certain embodiments of the present invention are implemented include computing nodes that are configured based on the PowerPC architecture utilized by the aforementioned POWER Servers, also referred to as Power ISA, offered by International Business Machines Corporation (IBM®). Elements of the environments, as described in Power ISA™ Version 2.07, May 3, 2013, is hereby incorporated by reference herein in its entirety. These technical environments into which embodiments of the present invention are implemented may include one or more aspects, as well as computing environments of other architectures, such as the z/Architecture, offered by International Business Machines Corporation, and described in z/Architecture—Principles of Operation, Publication No. SA22-7832-09, 10th Edition, September 2012, which is hereby incorporated by reference herein in its entirety. POWER, POWER ARCHITECTURE, POWERPC, Z/ARCHITECTURE, IBM, AIX, POWERVM, Z/OS and Z/VM (referenced herein) are registered trademarks of International Business Machines Corporation, Armonk, N.Y. Other names used herein may be registered trademarks, trademarks or product names of International Business Machines Corporation or other companies.

In an embodiment of the present invention, by providing a memory state micro-checkpoint structure to service processors to achieve high availability, after a failover, a backup service processor (e.g., backup FSP) can continue operations (e.g., servicing and managing servers in the distributed computing environment) without experiencing any service interruptions. For example, returning to the example environment, failing over to a backup would not cause the system to experience FSP and link error scenarios and corner cases, which are complex and problematic issues in existing distributed computing system designs. Thus, the simplification of micro-checkpoints in embodiments of the present invention enables system continuity, even if an FSP hot swap repair is required. Present checkpointing designs, which do not utilize a high level memory structure, do not support this functionality because of the potential complexities created by a failover that are avoided by the centralization of the functionality of a service processor in a program executing on the service processor that can utilize existing code paths to access dirty memory, including, but not limited to, as described in certain embodiments, a VM, and the checkpointing of the program, which can be a VM, in embodiments of the present invention.

Embodiments of the present invention provide advantages over known methods of checkpointing service processors. For example, the described implementation of embodiments of the present invention maintain high availability for service processor space and this high availability is provided on a live server. Additionally, embodiments of the present invention provide new functions for a service processor, including communication and handshakes, for example, between a primary service processor and a backup service processor, to be used in the event of a failure of the primary service processor. Embodiments of the present invention also provide interdependent locks between two or more physical service processors, e.g., the aforementioned primary and backup service processors.

Figure 4:
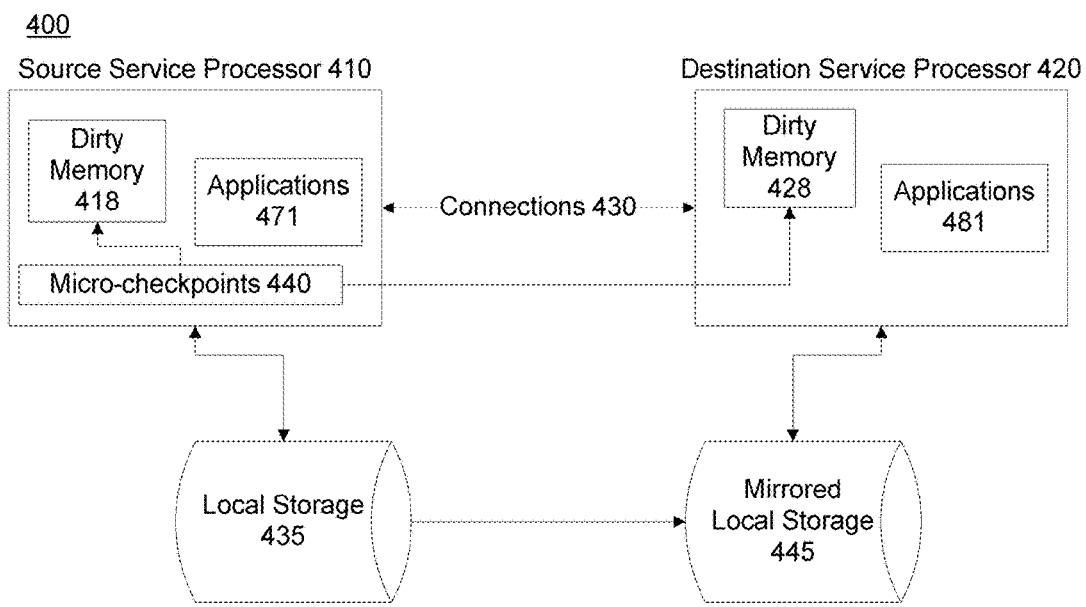
FIG. 4 is an example of a technical environments that includes certain aspects of an embodiment of the present invention.
Figure 5:
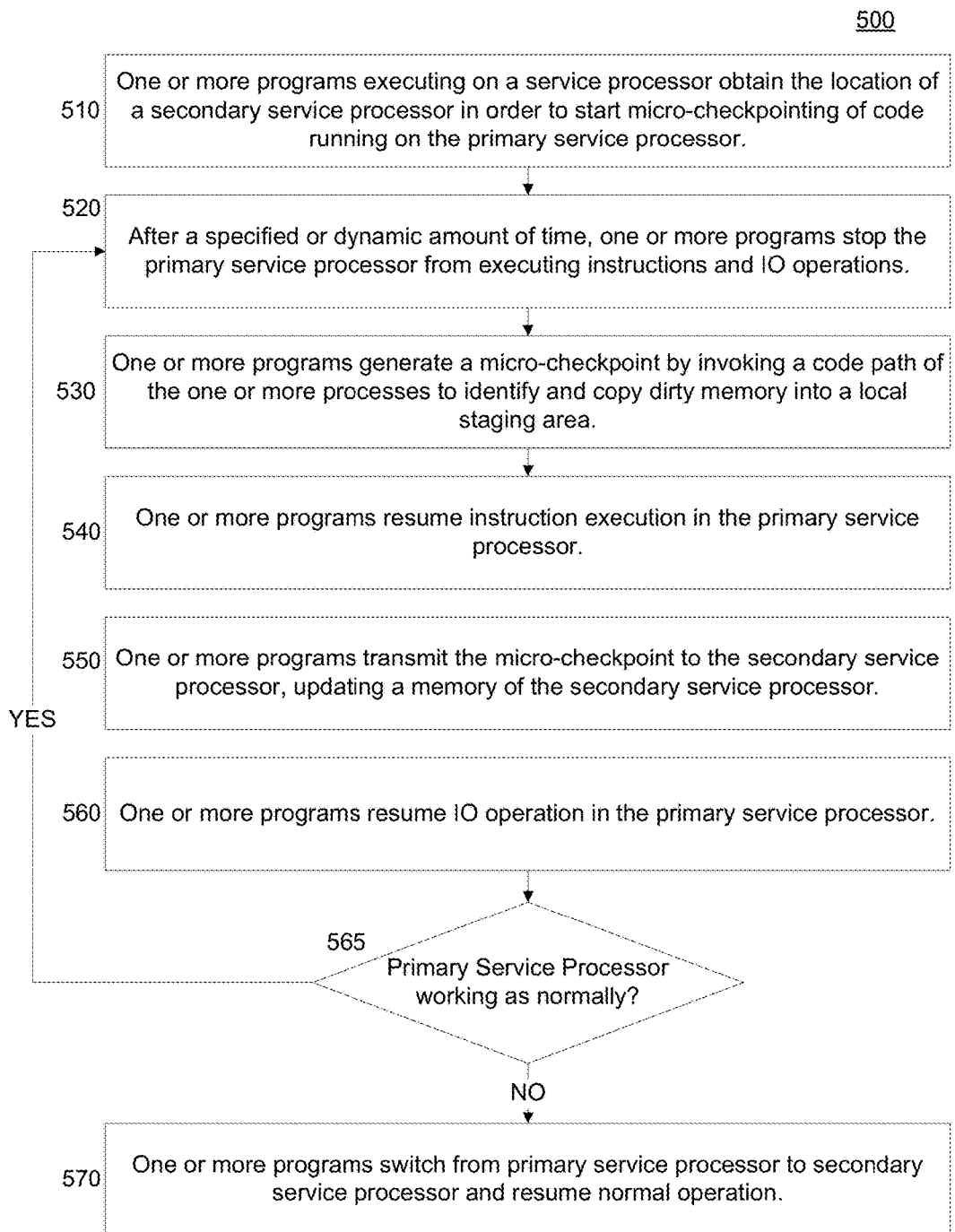
FIG. 5 depicts a workflow illustrating certain aspects of an embodiment of the present invention.

The use of redundancy is illustrated in FIG. 1, which includes a Source Service Processor 110, a primary service processor, and a Destination Service Processor 120, a backup or secondary service processor. As will be discussed, the embodiment of FIG. 1, as well as the workflow 200 that is FIG. 2, discuss how aspects of the present invention can be implemented in a technical environment 100 (FIG. 1) that includes at least one hypervisor running at least one VM. However, FIGS. 4-5 provide examples of embodiments of the present invention that do not include a virtualized environment. These different embodiments of the present invention are offered as illustrative examples and not to limit possible implementations of the functionality described into certain computing systems.

To establish the service processor redundancy, as illustrated in both FIGS. 1 and 4, in embodiments of the present invention, program code executed by a first service processor monitors a sibling service processor, in order to maintain synchronization to achieve substantially uninterrupted service processor functionality during failover and recovery to the sibling service processor. This interdependency provides an additional advantage as program code needs only calculate one active state and preserve memory state with no extra calculations related to the secondary (sibling) processor because the processors are synchronized. Embodiments of the present invention also preserve the state of a service processor, for recovery by a secondary service processor, because preservation of the memory state is substantially sufficient, including volatile memory, real time clock, Central Electronics Complex (CEC) hardware content, system model and machine state.

In an embodiment of the present invention, the program code can detect, capture and communicate processes to a dependent back up processor (e.g., Destination Service Processor 120, FIG. 1, Destination Service Processor 420, FIG. 4) to be used for substantially seamless service processor recovery. In an embodiment of the present invention, the two service processors are synchronized outside of IO. Embodiments of the present invention also enable the service processor to manage registry files because the synchronization aspect of the present invention (e.g., the utilization of the two service processors) manages and seamlessly recovers service processor registry files, VPD (vital product data) and the HMC (hardware maintenance console).

Checkpointing in embodiments of the present invention is also independent of code bugs resulting from new code functions being added or changed. Rather, in embodiments of the present invention, program code monitors dirty pages (pages whose contents have changed since the last checkpoint), locating dirty memory 118 128, to capture service processor memory state and NAND flash state. In embodiments of the present invention, by micro-checking the service processor, the program code removes duplicated component functions.

Embodiments of the present invention interact with non-volatile storage. For example, program code updates the aforementioned NAND flash drive outside the standard Operating System and VIVI input/output processes (e.g., Linux/KVIVI IO). (The NAND flash drive may utilize a Portable Operating System Interface (POSIX) with a wrapper and a check file to be synchronized, called an Application Programming Interface (API) and write a file to a local FSP.)

As aforementioned, FIG. 1 depicts a technical environment 100 that includes virtualization, in which aspects of embodiments of the present invention may be implemented. Embodiments of the present invention provide fault tolerance for a service processor in order to have continuous high availability redundancy for any of the functions within a system (not pictured) serviced and managed by the service processor. In order to maintain continuous high availability, embodiments of the present invention utilize redundant service processors, for example, the Source Service Processor 110 and the Destination Service Processor 120, illustrated in FIG. 1. Although not illustrated in FIG. 1, technical environments that utilize aspects of an embodiment of the present invention may include unique hardware outside of checkpointing that synchronizes the Service Processor 110 and the Destination Service Processor 120.

Referring to FIG. 1, in an embodiment of the present invention, program code executed by at least one processing circuit in the Source Service Processor 110 and the Destination Service Processor 120 load instructions for loading and running an Operating System, e.g., boot code. The Source Service Processor 110 and the Destination Service Processor may execute program code that includes these instructions from a hard drive, a memory, or directly from a processing unit, which may be integrated into a silicon wafer of an integrated circuit. In an embodiment of the present invention, the program code executes by processing circuits in the Source Service Processor 110 and the Destination Service Processor 120 include, for each processor, a kernel 115 125 of an Operating System executed on the Source Service Processor 110 and the Destination Service Processor 120. In an embodiment of the present invention, the Source Service Processor 110 and the Destination Service Processor 120 execute instructions that start a kernel 115 125 that starts and runs an Operating System, including but not limited to, a native Linux Operating System.

In an embodiment of the present invention, the Operating System of the Service Processor 110 and the Destination Service Processor 120 each run a host Kernel-based Virtual Machine (KVM/VM) 117 127 that executes instructions to create a virtual machine 112 122, which runs a virtualized (guest) version of the Operating System 112 122. When the Operating System is Linux, the native Linux runs the host KVM/VM and creates a virtualized Linux and the virtualized Linux in a standard Linux KVM/VM guest virtual machine. In an embodiment of the present invention, the virtualization on the service processors is managed by an Open Source 155 management software that hooks into Libvirt 132 142 of each service processor to manage the virtualization environment running on these servers. Libvirt 132 142 is a toolkit that interacts with the virtualization capabilities various Operating Systems, including but not limited to, Linux.

Certain elements of the technical environment 100 of FIG. 1 may be specific to embodiments of the present invention that utilize POWER Servers. As seen in FIG. 1, the Source Service Processor 110 and the Destination Service Processor 120 include Translation Control Entries (TCE) 131 141, which isolate IO access in memory. TCEs are used for the I/O address to memory address translation in order to perform direct memory access (DMA) transfers between memory and Peripheral Component Interconnect (PCI) adapters. This embodiment also includes Remote Direct Memory Access (RDMA) Adaptors 116 126 and may also utilize a Coherent Attached Processor Interface (CAPI) to speed up the transfer of the checkpoints via more direct memory to memory transfer operation, for example, from local storage 135, to mirrored local storage 145.

In an embodiment of the present invention, one or more processing circuits in the Source Service Processor 110 and the Destination Service Processor 120 run program code (e.g., functions) inside the virtual machines 112 122 that, previous to the implementation of the described aspects of an embodiment of the present invention, would run on a service processor. For example, in an embodiment of the present invention where the Source Service Processor 110 is an FSP, which connects the managed system to the Hardware Management Console, (HMC) the functionality that was formerly provided by the firmware of the FSP on the FSP, but is executed by program code of the virtual machine 112 provides diagnostics, initialization, configuration, run-time error detection and correction. In order for the virtual machines 112 122 to execute functionality formerly executed directly by the Source Service Processor 110 and/or the Destination Service Processor 120, in an embodiment of the present invention, the KVM/VMs 117 127 execute an emulator, for example a Quick Emulator (QEMU) 114 124 component. In an embodiment of the present invention, the virtual machine 112 122 executes applications 133 143 on a guest operating system 113 123.

In an embodiment of the present invention, once the Source Service Processor 110 and the Destination Service Processor 120 have executed instructions to initialize an Operating System, one or more processing circuits of these processors initializes program code to checkpoint the Source Service Processor 110. After the virtual machine 112 starts (boots), program code that includes checkpointing, underneath the virtual machine 112 and inside an emulator 114 run on the KVM/VM 117, including but not limited to a QEMU, obtains a parameter of the location of the secondary service processor, the Destination Service Processor 120. In an embodiment of the present invention, the program code obtains this parameter either through the external Ethernet link available on all service processors, or by modifying the existing checkpointing protocol to use some other internal link to communicate between service processors. In FIG. 1, connections 130 between the Source Service Processor 110 and the Destination Service Processor 120 are illustrated and in one example, the program code may obtain the parameter over the illustrated connections 130 between the Source Service Processor 110 and the Destination Service Processor 120. In an embodiment of the present invention, the micro-checkpointing 140 is executed by program code directly on the Source Service Processor 110 and performs the micro-checkpointing operations on the functionality that is executed in the virtual machine 112.

Referring to FIG. 1, by coupling Source Service Processor 110 and the Destination Service Processor 120, embodiments of the present invention include a high availability service processor system. Program code executing on one or more processing circuits of the service processors utilizes processor and memory state checkpointing. To enable this high availability, program code synchronizes the service processors, the Source Service Processor 110 and the Destination Service Processor 120, which allows for continuity when a service processor fails. During operation, the Source Service Processor 110 and the Destination Service Processor 120 may communicate utilizing handshaking mechanisms. To enable a failover from one service processor to the other, embodiments of the present invention utilize interdependent locks between the two physically separate service processors, Source Service Processor 110 and the Destination Service Processor 120. Meanwhile, program code sends and receives a periodic signal (heartbeat) between the Source Service Processor 110 and the Destination Service Processor 120 at a regular interval (e.g., every few seconds) to synchronize these computing nodes. Exchanging heartbeats enables the program code to monitor the Destination Service Processor 120 to achieve substantially uninterrupted service processor functionality during failover and recovery to the Destination Service Processor 120. In an embodiment of the present invention, program code synchronizing the processors enables the management and seamless recovery of service processor registry files, VPD (vital product data) and the HMC. In an embodiment of the present invention, the described monitoring could be accomplished separate hardware (e.g., a watch dog timer), instead of utilizing a Destination Service Processor 120 to ping the Source Service Processor 110. However, this latter approach would require additional specialized hardware, which can be advantageously avoided in certain embodiments of the present invention.

Figure 6:
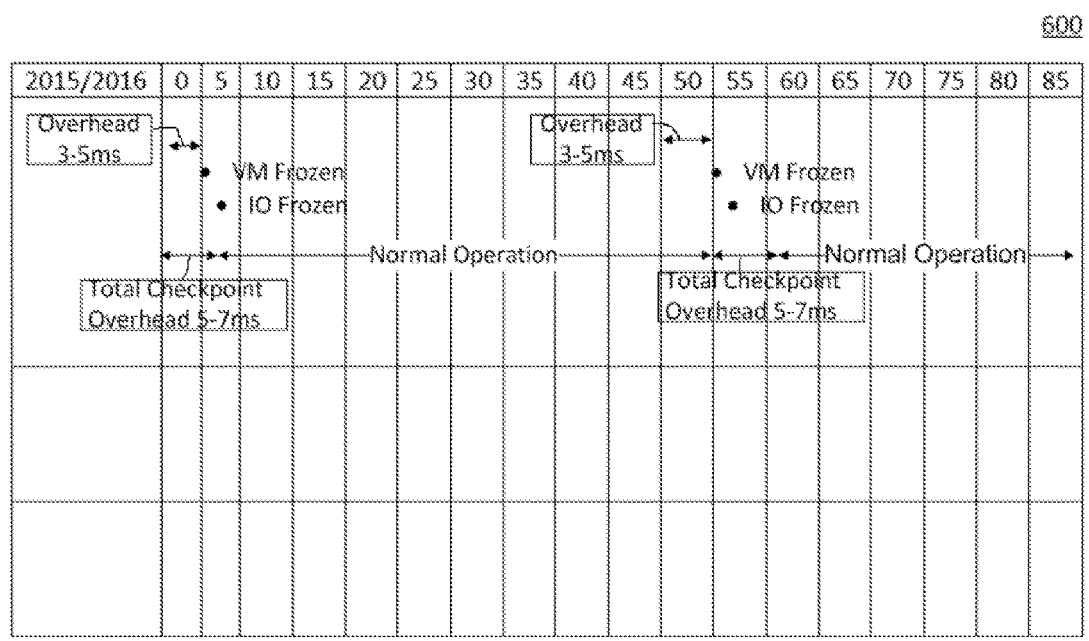
FIG. 6 is a timing chart illustrating certain aspects of an embodiment of the present invention.

As understood by one of skill in the art, in an embodiment of the present invention, one or more programs (e.g., hardware) control which service processor executes work and also when to fail over a given service processor (e.g., Source Service Processor 110) to a backup (e.g., Destination Service Processor 120). The one or more programs stop the initial service processor from executing any work briefly while one or more programs copy the dirty memory to buffer memory in the initial service processor. When the one or more programs complete copying the dirty memory, the work can resume, but not IO, which remain halted until the buffer in the primary is sent to the back up. For example, in FIG. 1, the program code, at the time of a checkpoint, sends the dirty memory, at the time of a checkpoint, through the Source RDMA adapter 116 (i.e., the primary service processor) to Destination RDMA Adaptor 126 (i.e., the backup service processor). During this time, the Source Service Processor 110 can continue dirtying memory because the snap shot captured from the dirty memory since the snap shot was captured in the buffer, but the Source Service Processor 110 cannot execute IO. Thus, one or more programs control the stopping of the Source Service Processor 110, allow the Source Service Processor 110 to continue once the dirty memory is transferred to the Destination Service Processor 120. FIG. 6 is a timing chart that illustrates this type of continuity where one or more programs preserve as much of the normal operation of a service processor as possible, at all times.

Figure 2:
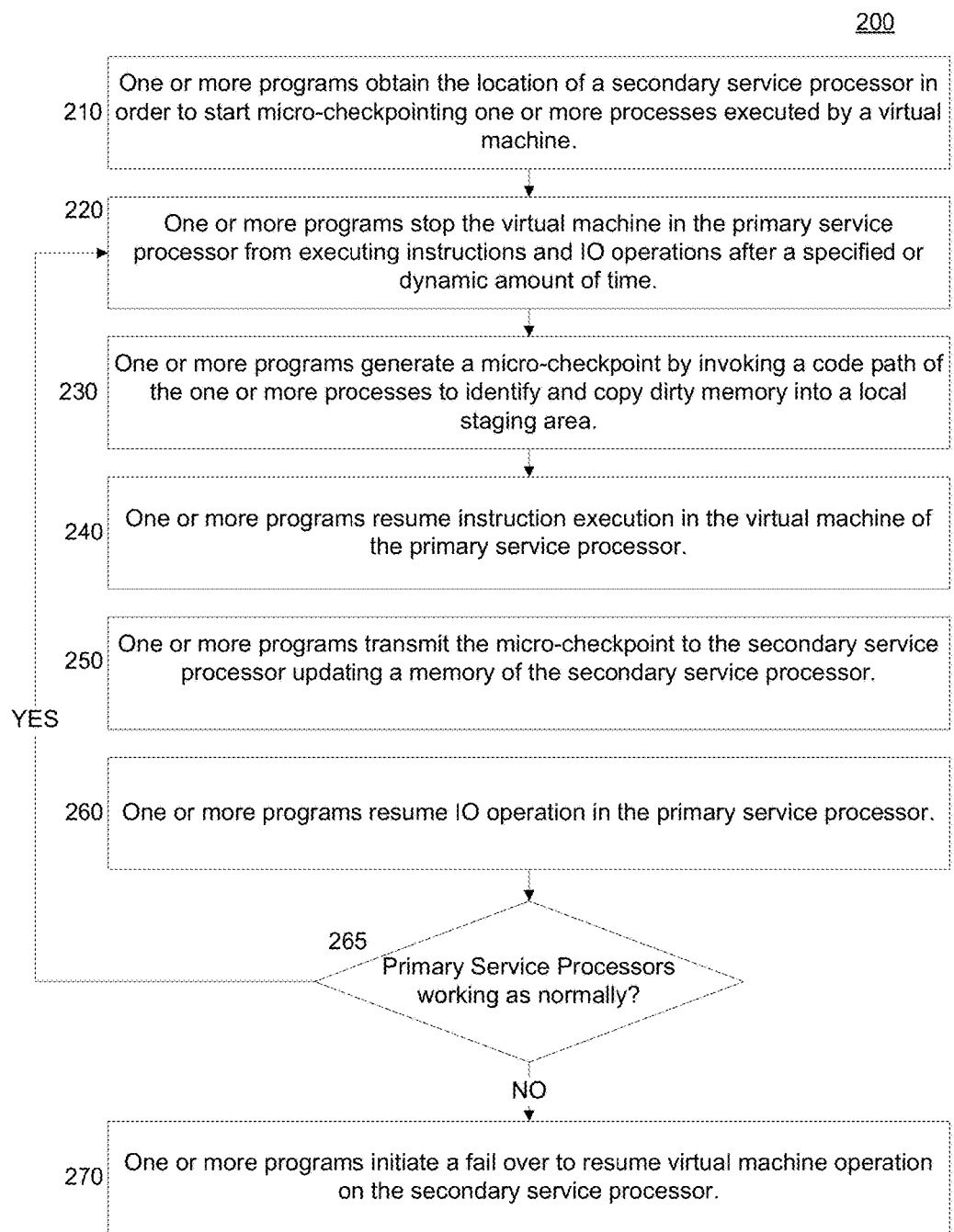
FIG. 2 depicts a workflow illustrating certain aspects of an embodiment of the present invention.

FIG. 2 is a workflow 200 that illustrates program code executing the checkpointing of a service processor in accordance with aspects of an embodiment of the present invention. Because, as illustrated in FIG. 1, in embodiments of the present invention program code executes functionality in a virtual machine, rather than directly on the service processor, in order to checkpoint the processes executed by the service processor, the program code micro-checkpoints the virtual machine executing the processes. As understood by one of skill in the art, micro-checkpointing is a method for providing fault tolerance to a running virtual machine with little or no runtime assistance from the guest kernel or guest application software.

As aforementioned, in an embodiment of the present invention, the program code starts initializing micro-checkpointing code (e.g., underneath the VM inside QEMU) by obtaining the location of the secondary service processor (e.g., as a parameter) (210). The program code runs the micro-checkpointing code and stops the VM in the primary service processor from executing instructions and IO operations after a specified or dynamic amount of time (e.g., a specified or dynamic number of milliseconds) (220). The program code then generates a micro-checkpoint by invoking a code path of the program code to identify and copy dirty memory into a local staging area (230). For example, in an embodiment of the present invention, the one or more programs generate the micro-checkpoint by temporary halting operations in the primary service processor and utilizes a live partition migration function of the hypervisor to identify and copy dirty memory (i.e., memory locations that have changed since the last checkpoint) to the local staging area. An example of a local staging area on Source Service Processor 110 is Local Storage 135. In an embodiment of the present invention, in generating the micro-checkpoint, the program code captures the service processor memory state and, in certain embodiments of the present invention, NAND flash state, by monitoring dirty pages (i.e., pages whose contents have changed since the last checkpoint).

Figure 3:
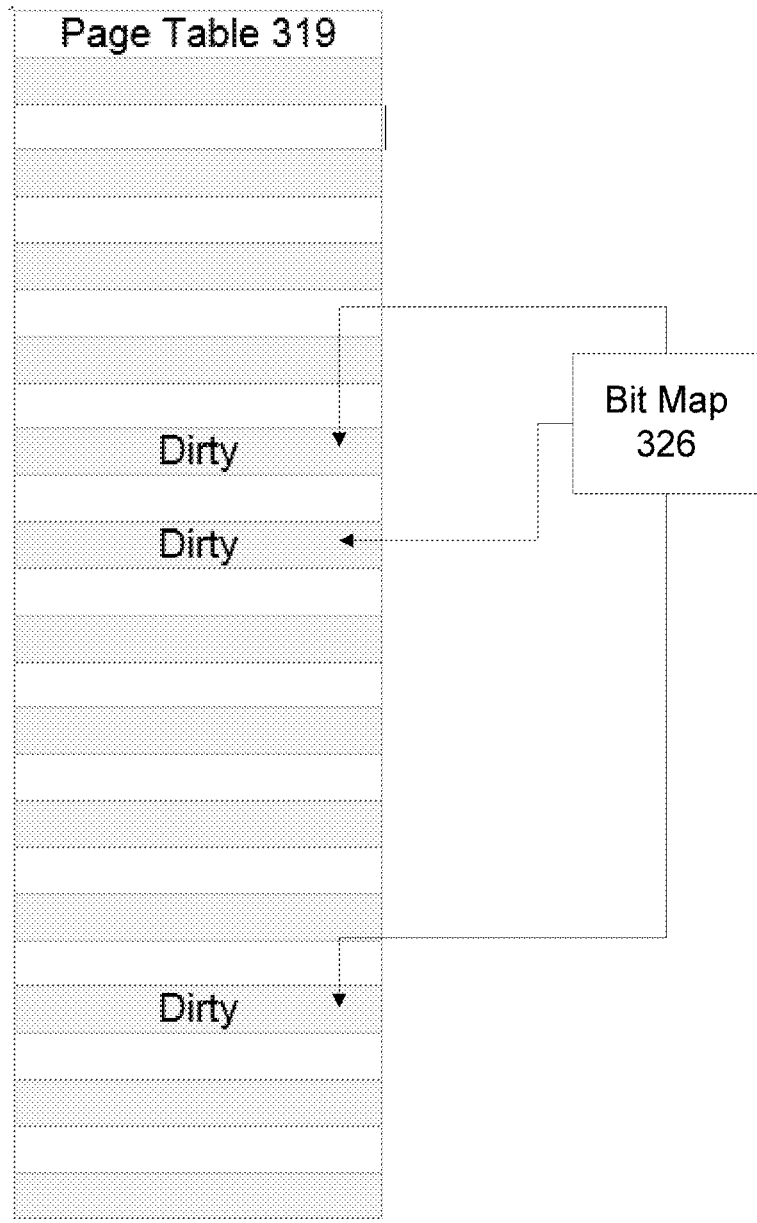
FIG. 3 illustrates this aspect of the present invention with respect to a page table in a service processor.

As seen in FIG. 1, monitoring the dirty memory 118 of the Source Service Processor 110, for example, includes scanning a the page tables 119 111 of the Source Service Processor 110 and adding a bit map to mark when a page fault occurs. FIG. 3 illustrates this aspect of the present invention with respect to a page table 319 in a service processor. The program code creates a bit map 362 by scanning a page table 319 for dirty entries. This bit map 362 structure can be utilized by the program code faster than performing a full scan of the page table 319.

Returning to FIG. 2, in an embodiment of the present invention, the program code resumes the instruction execution in the virtual machine of the primary service processor (240). By resuming the instruction execution virtual machine immediately, the program code enables certain functions of the service processor to continue, while the aspects of the checkpointing process can continue in parallel; micro-checkpointing is also referred to as continuous replication due to the system continuity that it affords.

The program code transmits the micro-checkpoint to the secondary (i.e., destination) service processor, updating the memory of the secondary service processor (250). In an embodiment of the present invention, the memory in the destination service processor is updated with the changes since the last checkpoint. In an embodiment of the present invention, the program code transmits the micro-checkpoint to the destination secondary service processor via a live partition migration function in the hypervisor. The relationship between the initial service processor and a backup or destination service processor is discussed above with references to FIG. 1. As described in reference to FIG. 1, in an embodiment of the present invention, the program code detects, captures and communicates to a dependent back up processor to be used for substantially seamless service processor recovery, nonvolatile storage (e.g., NAND Flash) that is updated outside the standard Linux/KVM IO and, in further embodiments, IO processes outside standard Linux IO processes.

Returning to FIG. 2, the program code resume IO operation in the primary service processor (260). In an embodiment of the present invention, the program code utilizes the live partition migration function of the hypervisor to allow IO operation to resume. The program code resumes IO operations after the checkpoint information (e.g., a snapshot) in transmitted because if instructions continue (but not IO) and the primary service processor fails before the snapshot transfer is complete, the program code can initiate a fail over and re-execute those instructions on the destination service processor. However if IO was issued by the primary service processor, during this period, the program code may not be able to recover. IO operations may include a financial transaction initiated by logging into the server, or a record update on the hard drive; those IO operation would be lost.

As seen in FIG. 2, provided that the primary service processor continues to operate normally, the micro-checkpointing process continues (265) (220). The primary service processor would fail to operate normally in the event of a technical failure of this processor of if it becomes unresponsive. Failures includes broken hardware, code bugs, or any condition causes the service processor to stop operating within its expected performance specifications and design parameters. However, in the event that the primary service processor ceases to operate normally (265), the program code initiates a fail over to resume virtual machine operation on the secondary service processor (270). Because, as illustrated in FIG. 1, because the initial service processor, the primary service processor, and the backup service processor, the secondary service processor, are synchronized, the swap of the service processors can be accomplished with only minor service interruption.

In an embodiment of the present invention, because the functionality of the service processor is executed in a virtual machine, rather than directly by the service processor, when the program code checkpoints the virtual machine, the checkpoint provides a full accounting of the information necessary to restart this functionality by restarting the virtual machine with the last available checkpoint. When this functionality is executed directly on the service processor, in order to restore the functionality after the failure, the service processor must individually handle each specific service processor function that is required to have its state preserved for recovery by a secondary service processor, since preservation of the memory state alone is substantially sufficient including volatile memory, real time clock, CEC hardware content, system model and machine state.

In certain embodiments of the present invention, certain functionality executed by a virtual machine that is generally run on the service processor directly, may or may not be protected. Thus, after a failure, the unprotected functions may need to reconnect with the newly recovered virtual machine and establish awareness that the secondary service processor is not the primary service processor.

As illustrated in FIGS. 1-2, embodiments of the present invention include program code executed by a processing circuit in a first service processor of a distributed computing environment obtains a location of a second service processor, where the second service processor is communicatively coupled to the first service processor. The program code stops a virtual machine during runtime (e.g., after a specified number of milliseconds or a dynamic number of milliseconds), where the virtual machine is executed by a hypervisor running on the first service processor, and where during runtime, the virtual machine executes one or more processes to service and manage computing resources in the distributed computing environment. The program code generates a micro-checkpoint of the virtual machine by invoking a code path of the one or more processes to identify and copy dirty memory into a local staging area on the first service processor. The program code resumes the virtual machine and transmits the micro-checkpoint to a second service processor based on the location, where program code executed by a processing circuit of the second service processor utilizes the micro-checkpoint to enable a hypervisor on the second service processor to start a virtual machine on the second service processor. In an embodiment of the present invention, the first service processor and the second service processor are physically separate service processors.

In an embodiment of the present invention, program code executed by the processing circuit of the second service processor utilizes the micro-checkpoint to enable the hypervisor on the second service processor to start the virtual machine on the second service processor, based on obtaining an indication of a failure of the first service processor.

In an embodiment of the present invention, the program code executed by the processing circuit of the first service processor, transmits a first periodic signal to the second service processor, at a regular interval and obtains, from the second service processor, a second periodic signal, at the regular interval. In an embodiment that includes this heartbeat functionality, when the program code transmits the micro-checkpoint, it may first verify that the first service processor obtained the second periodic signal from the second service processor during the regular interval that is within a pre-defined time limitation. In an embodiment of the present invention, the program code may synchronize the first service processor to the second service processor by exchanging registry information with the second service processor utilizing a handshaking mechanism.

In an embodiment of the present invention, program code executed by the processing circuit of the first service processor may obtain an indication that the virtual machine of the second service processor is executing the one or more processes to service and manage the computing resources in the distributed computing environment. Based on obtaining the indication, the program code may enable an interdependent lock on the first service processor. In an embodiment of the present invention, the program code may also obtain a micro-checkpoint from the second service processor, retain the micro-checkpoint, obtain an indication of a failure of the second service processor, and based on the indication, load the micro-checkpoint into a memory communicatively coupled to the processing circuit and utilize the micro-checkpoint to re-start the virtual machine on the first service processor.

In an embodiment of the present invention, the micro-checkpoint includes a memory state of the first service processor and a state of a structure that holds nonvolatile data in the first service processor. In an embodiment of the present invention, the transmitting of the micro-checkpoint may also include the program code communicating a state of input/output processes executed in the virtual machine executing on the first service processor.

In an embodiment of the present invention, prior to obtaining the location, the program code starts the virtual machine on the first service processor. To start the virtual machine, the program code loads instructions for loading and running an operating system on the first service processor, starts a kernel that runs the operating system, executes, by the operating system, instructions to start the hypervisor, and starts, via the hypervisor, the virtual machine on the first service processor, where the virtual machine runs a virtual operating system.

Turning now to FIG. 4, in an embodiment of the present invention, program code leverages live partition migration code paths to micro-check a service processor without utilizing a virtualized environment. As seen in this technical environment 400, applications 471 481 execute on the Source Service Processor 410 and/or the Destination Service Processor 120 and these applications can change the memory of the respective service processors. The memory in the service processor that has changed since the last checkpoint is the dirty memory 418 428. The applications 471 481 may include VMs running as well as the hypervisor. The applications 471 481 include program code running on the Source Service Processor 410 and/or the Destination Service Processor 120, respectively. As will be explained further in FIG. 5, in order to generate a micro-checkpoint, program code (micro-checkpoints 440) stops the program code executing on a service processor (e.g., Source Service Processor 410) and detects and checkpoints the memory in the service processor that has changed since the last checkpoint (e.g., the dirty memory 418).

As understood by one of skill in the art, due to the high-frequency nature of micro-checkpointing, program code in an embodiment of the present invention generates a new micro-checkpoint many times per second because missing just a few micro-checkpoints could constitutes a failure. Because of the consistent buffering of device I/O, this is safe because device IO is not committed to the outside world until the micro-checkpoint has been received at the destination.

FIG. 5 is a workflow 500 that illustrates program code executing the checkpointing of a service processor in accordance with aspects of an embodiment of the present invention. As understood by one of skill in the art and explained earlier, the program code may include both hardware and software and, in the context of the embodiment of FIG. 5, includes software that can be used alone or in conjunction with processing circuits in hardware. This workflow 500 is illustrated, for ease of understanding, with examples from FIG. 4. In an embodiment of the present invention, program code executing on a service processor (e.g., Source Service Processor 410) starts initializing micro-checkpointing code by obtaining the location of the secondary service processor (e.g., Destination Service Processor 420) (e.g., as a parameter) in order to start micro-checkpointing of code (e.g., one or more programs) running on the primary service processor (510).

After a specified or dynamic amount of time, one or more programs stop the primary service processor from executing instructions and IO operations (520). The program code then generates a micro-checkpoint by invoking a code path of the program code to identify and copy dirty memory into a local staging area (e.g., Local Storage 435) (530). In an embodiment of the present invention, the program code generates the micro-checkpoint by temporary halting operations in the primary service processor while it identifies and copies dirty memory (i.e., memory locations that have changed since the last checkpoint) to a local staging area. In an embodiment of the present invention, in generating the micro-checkpoint, the program code captures the service processor memory state and, in certain embodiments of the present invention, NAND flash state, by monitoring the dirty pages.

In an embodiment of the present invention, the program code resumes instruction execution in the primary service processor (540) so that certain of the service processor functions continue while the aspects of the checkpointing process continue in parallel. In an embodiment of the present invention, the program code allows the primary service processor to resume instruction execution. The program code transmits the micro-checkpoint to the secondary service processor, updating a memory of the secondary service processor (550). In an embodiment of the present invention, upon receipt of the transmission, program code updates the memory in the secondary service processor is updated with the changes since the last checkpoint. In an embodiment of the present invention, the program code resumes IO operation in the primary service processor (560).

Provided that the primary service processor continues to operate normally, the micro-checkpointing process continues (565) (520). In the event that the primary service processor ceases to operate normally (565), the program code switches from primary service processor to secondary service processor and resumes normal operation (570).

In the case where this process fails (555), the program code will generate a micro-checkpoint (520) and repeat (557) this described process, as illustrated in FIG. 5. Upon failure of this process, the program code loads the contents of the last micro-checkpoint at the destination back into memory, and runs the one or more programs on the destination processor (560) (e.g., applications 481). In the event that the service processor fails (558), the program code will load the contents of the last micro-checkpoint at the destination service processor back into memory and run the one or more programs on the destination service processor (560).

The program code can initiate the virtual machine on a backup service processor, rather than on the initial service processor, which experienced the failure. Due to the heartbeat functionality aspect of the present invention, accomplished based on the connectivity between the service processors (e.g., connections 430), the initial service processor and the backup service processor are synchronized, so the swap of the service processors can be accomplished with only minor service interruption. If there is no failure, micro-checkpointing continues.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. Aspects of embodiments of the present invention, including the checkpointing and the management of a distributed environment with at least two service processors can be utilized to manage a distributed network such as a cloud computing system.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more processors utilized integrated into and/or utilized by program code in the display device, and computing nodes from which the program code obtains product models can be understood as a cloud computing node 10 (FIG. 7) and if not a cloud computing node 10, then a general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 8:
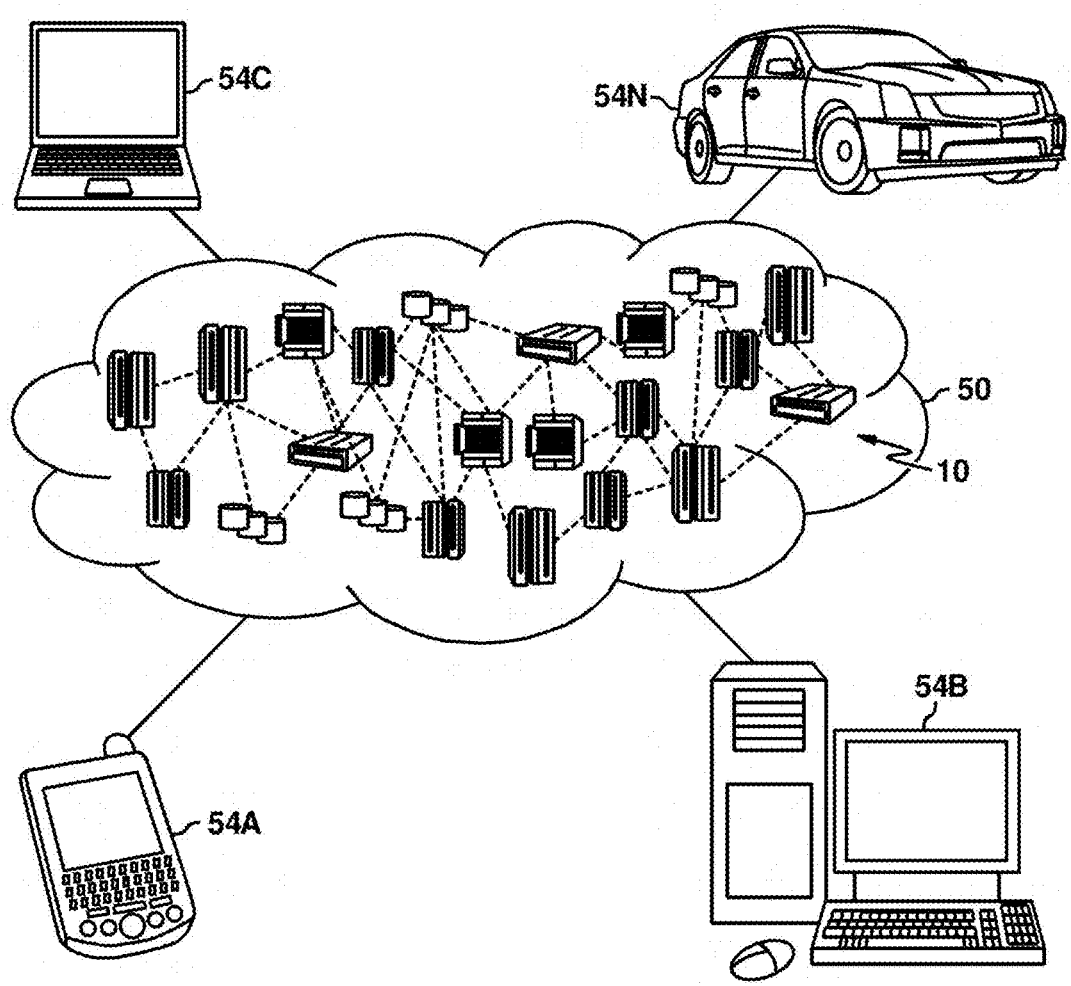
FIG. 8 depicts one embodiment of a cloud computing environment.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 9:
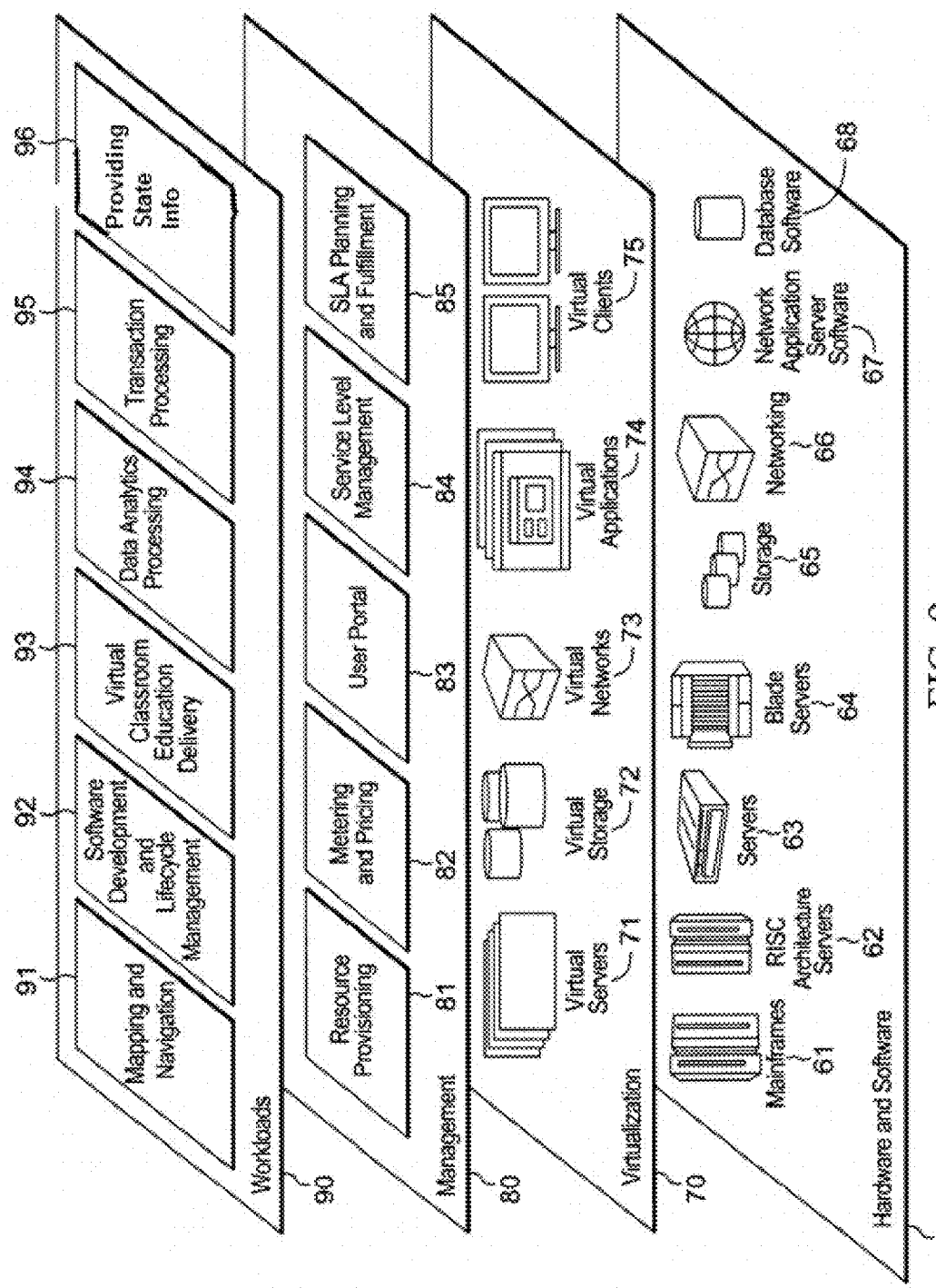
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing state information to a service processor in an environment during a checkpointing process 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
obtaining, by a processing circuit in a first service processor in a distributed computing environment, a location of a second service processor, wherein the second service processor is communicatively coupled to the first service processor;
stopping, by the processing circuit, a virtual machine during runtime, wherein the virtual machine is executed by a hypervisor running on the first service processor, and wherein during runtime, the virtual machine executes one or more processes to service and manage computing resources in the distributed computing environment, wherein the stopping comprises stopping instruction execution and stopping IO operations in the first service processor, and wherein based on the stopping the instruction execution and the IO operations are suspended;
generating, by the processing circuit, a micro-checkpoint of the virtual machine by invoking a code path of the one or more processes to identify and copy dirty memory into a local staging area on the first service processor;
determining, by the processing circuit, that copying the dirty memory into the local staging area on the first service processor is complete;
based on determining that the copying is complete resuming, by processing circuit, instruction execution in the first service processor by the virtual machine and continuing suspension of the IO operations in the first service processor;
transmitting, by processing circuit, the micro-checkpoint to a second service processor based on the location, wherein a processing circuit of the second service processor utilizes the micro-checkpoint to enable a hypervisor on the second service processor to start a virtual machine on the second service processor;
determining, by the processing circuit, that the transmitting is complete; and
based on determining that the transmitting is complete, resuming, by the processing circuit, IO operations in the first service processor.

2. The computer-implemented of claim 1, wherein the processing circuit of the second service processor utilizes the micro-checkpoint to enable the hypervisor on the second service processor to start the virtual machine on the second service processor, based on obtaining, by the processing circuit of the second service processor, an indication of a failure of the first service processor.

3. The computer-implemented of claim 1, further comprising:
transmitting, by the processing circuit of the first service processor, to the second service processor, a first periodic signal at a regular interval; and
obtaining, by the processing circuit, from the second service processor, a second periodic signal at the regular interval.

4. The computer-implemented of claim 3, wherein the transmitting the micro-checkpoint further comprises:
verifying, by the processing circuit, that the processing circuit obtained the second periodic signal from the second service processor during the regular interval within a pre-defined time limitation.

5. The computer-implemented method of claim 1, further comprising:
synchronizing, by the processing circuit of the first service processor, the first service processor to the second service processor by exchanging information with the second service processor utilizing a handshaking mechanism.

6. The computer-implemented method of claim 5, the information comprising at least one of: registry information, virtual product data, or shared data.

7. The computer-implemented method of claim 1, further comprising:
obtaining, by the processing circuit of the first service processor, an indication that the virtual machine of the second service processor is executing the one or more processes; and
based on obtaining the indication, enabling, by the processing circuit, an interdependent lock on the first service processor.

8. The computer-implemented method of claim 7, further comprising:
obtaining, by the processing circuit of the first service processor, a micro-checkpoint from the second service processor and retaining the micro-checkpoint;
obtaining, by the processing circuit, an indication of a failure of the second service processor;
based on the indication, loading, by the processing circuit, the micro-checkpoint into a memory communicatively coupled to the processing circuit; and
utilizing, by the processing circuit, the micro-checkpoint to re-start the virtual machine on the first service processor.

9. The computer-implemented method of claim 1, wherein the first service processor and the second service processor are physically separate service processors.

10. The computer-implemented of claim 1, wherein the stopping of the virtual machine is after one of: a specified number of milliseconds or a dynamic number of milliseconds.

11. The computer-implemented of claim 1, wherein the micro-checkpoint comprises a memory state of the first service processor and a state of a structure that holds nonvolatile data in the first service processor.

12. The computer-implemented of claim 1, wherein the transmitting further comprises communicating a state of input/output processes executed in the virtual machine executing on the first service processor.

13. The computer-implemented of claim 1, further comprising:
prior to obtaining the location, starting, by the processing circuit of the first service processor, the virtual machine on the first service processor, wherein the starting comprises:
loading, by the processing circuit, instructions for loading and running an operating system on the first service processor;
starting, by the processing circuit, a kernel that runs the operating system;
executing, by the operating system, instructions to start the hypervisor; and
starting, by the hypervisor, the virtual machine on the first service processor, wherein the virtual machine runs a virtual operating system.

14. A computer program product comprising:
a computer readable storage medium readable by one or more processing circuits and storing instructions for execution by the one or more processing circuits for performing a method comprising:
obtaining, by a processing circuit in a first service processor in a distributed computing environment, a location of a second service processor, wherein the second service processor is communicatively coupled to the first service processor;
stopping, by the processing circuit, a virtual machine during runtime, wherein the virtual machine is executed by a hypervisor running on the first service processor, and wherein during runtime, the virtual machine executes one or more processes to service and manage computing resources in the distributed computing environment, wherein the stopping comprises stopping instruction execution and stopping IO operations in the first service processor, and wherein based on the stopping the instruction execution and the IO operations are suspended;
generating, by the processing circuit, a micro-checkpoint of the virtual machine by invoking a code path of the one or more processes to identify and copy dirty memory into a local staging area on the first service processor;
determining, by the processing circuit, that copying the dirty memory into the local staging area on the first service processor is complete;
based on determining that the copying is complete resuming, by processing circuit, instruction execution in the first service processor by the virtual machine and continuing suspension of the IO operations in the first service processor;
transmitting, by processing circuit, the micro-checkpoint to a second service processor based on the location, wherein a processing circuit of the second service processor utilizes the micro-checkpoint to enable a hypervisor on the second service processor to start a virtual machine on the second service processor;
determining, by the processing circuit, that the transmitting is complete; and
based on determining that the transmitting is complete, resuming, by the processing circuit, IO operations in the first service processor.

15. The computer program product of claim 14, wherein the processing circuit of the second service processor utilizes the micro-checkpoint to enable the hypervisor on the second service processor to start the virtual machine on the second service processor, based on obtaining, by the processing circuit of the second service processor, an indication of a failure of the first service processor.

16. The computer program product of claim 14, the method further comprising:
transmitting, by the processing circuit of the first service processor, to the second service processor, a first periodic signal at a regular interval; and
obtaining, by the processing circuit, from the second service processor, a second periodic signal at the regular interval.

17. The computer program product of claim 16, wherein the transmitting the micro-checkpoint further comprises:
verifying, by the processing circuit, that the processing circuit obtained the second periodic signal from the second service processor during the regular interval within a pre-defined time limitation.

18. The computer program product of claim 14, the method further comprising:
synchronizing, by the processing circuit of the first service processor, the first service processor to the second service processor by exchanging information with the second service processor utilizing a handshaking mechanism.

19. The computer program product of claim 14, the method further comprising:
obtaining, by the processing circuit of the first service processor, an indication that the virtual machine of the second service processor is executing the one or more processes; and
based on obtaining the indication, enabling, by the processing circuit, an interdependent lock on the first service processor.

20. A system comprising:
a memory;
one or more processing circuits in communication with the memory; and
program instructions executable by the one or more processing circuits via the memory to perform a method, the method comprising:
obtaining, by a processing circuit in a first service processor in a distributed computing environment, a location of a second service processor, wherein the second service processor is communicatively coupled to the first service processor;
stopping, by the processing circuit, a virtual machine during runtime, wherein the virtual machine is executed by a hypervisor running on the first service processor, and wherein during runtime, the virtual machine executes one or more processes to service and manage computing resources in the distributed computing environment, wherein the stopping comprises stopping instruction execution and stopping IO operations in the first service processor, and wherein based on the stopping the instruction execution and the IO operations are suspended;
generating, by the processing circuit, a micro-checkpoint of the virtual machine by invoking a code path of the one or more processes to identify and copy dirty memory into a local staging area on the first service processor;

determining, by the processing circuit, that copying the dirty memory into the local staging area on the first service processor is complete;

based on determining that the copying is complete resuming, by processing circuit, instruction execution in the first service processor by the virtual machine and continuing suspension of the IO operations in the first service processor;

transmitting, by processing circuit, the micro-checkpoint to a second service processor based on the location, wherein a processing circuit of the second service processor utilizes the micro-checkpoint to enable a hypervisor on the second service processor to start a virtual machine on the second service processor;

determining, by the processing circuit, that the transmitting is complete; and based on determining that the transmitting is complete, resuming, by the processing circuit, IO operations in the first service processor.

\* \* \* \* \*